United States Patent [19]
Weiberg

[11] 3,772,860
[45] Nov. 20, 1973

[54] HARVESTING MACHINE

[75] Inventor: Rüdiger Weiberg, Braunschweig, Germany

[73] Assignee: Maschinenfabrik August Herbold, Braunschweig, Germany

[22] Filed: Oct. 1, 1970

[21] Appl. No.: 77,264

[52] U.S. Cl. .......................... 56/13.5, 56/130, 56/35
[51] Int. Cl. .............................................. A01d 45/18
[58] Field of Search .................... 56/130, 33, 126, 56/34, 119, 35, 219, 220, 221, 222, 223, 224, 127, 128, 129, 153, 154, 155, 156, 157, 158, 14.1, 14.2, 14.3, 14.4, 14.5, 12.8, 13.5

[56] References Cited
UNITED STATES PATENTS

| 1,384,626 | 7/1921  | Mouchet    | 56/130 |
| 3,511,037 | 5/1970  | Paulson    | 56/130 |
| 1,218,011 | 3/1917  | Spikes     | 56/130 |
| 1,370,919 | 3/1921  | Schaefer   | 56/130 |
| 1,334,933 | 3/1920  | Hamilton   | 56/219 |
| 751,073   | 2/1904  | Helgerson  | 56/130 |
| 1,259,465 | 3/1918  | Sanford    | 56/126 |
| 2,022,779 | 12/1935 | Peppard, Jr. | 56/126 |
| 3,408,797 | 11/1968 | Currence   | 56/13.5 |
| 1,555,695 | 9/1925  | Novak      | 56/130 |
| 2,084,049 | 6/1937  | Rosenvold  | 56/219 |
| 3,014,326 | 12/1961 | Murray     | 56/219 X |
| 3,190,062 | 6/1965  | Paulson et al. | 56/130 |

*Primary Examiner*—Russell R. Kinsey
*Attorney*—Michael S. Striker

[57] ABSTRACT

A harvesting machine for harvesting produce from plants which grow in elongated rows and are of the bush variety. A vehicle is capable of advancing longitudinally of the respective rows and carries stripping or plucking means extending transversely to the elongation of the rows and being operative for plucking produce off the plants. A conveyor receives the produce and conveys it away from the plucking means. A plant supplying or engaging arrangement in form of a conveyor having engaging portions, or of a shaped sheet-metal guide, is provided ahead of the plucking means and rises from the lower region of the vehicle forwardly and upwardly at a predetermined angle to engage the plants and supply to them within the operative range of the plucking means.

7 Claims, 3 Drawing Figures

HARVESTING MACHINE

BACKGROUND OF THE INVENTION

The present invention relates generally to harvesting machines, and more particularly to produce-harvesting machines. Still more specifically the present invention relates to a machine for harvesting produce from bush-type or brush-type plants growing in a row, such as bush beans and other tendril-type produce.

At the outset it should be understood that the term "produce" is intended to incorporate any growth which might be carried by such plants, whether it be vegetable growth or fruit growth.

Naturally, it is already known to have harvesting machines for the above-identified purpose. They generally use a vehicle which is usually self-propelled and which is provided with a stripping or plucking arrangement in form of an elongated roller turning about its longitudinal axis and being provided on its periphery with projecting plucking fingers which when they engage the plant, strip off the produce and deposit it on a conveyor or other device from where it is carried away out of the vicinity of the plucking device. In the known machines of this type, however, the roller is invariably so arranged that in the operation of the machine it extends in substantial parallelism with the elongation of the row of plants which are being harvested. It is arranged at an upwardly inclined angle, as seen with the direction of advancement of the machine, in such a manner that the beans or whatever other produce is involved are plucked off over the entire height of the plant. A guide trough arcuately surrounds the roller with spacing from a portion of its periphery and both cooperates with the plucking fingers as well as serving in effect as a means of retaining and holding in position the respective plant for the period of time during which the produce is stripped off the plant by the plucking fingers.

These known machines perform their primary intended function, namely the harvesting of produce from plants of the type under discussion. They are, however, possessed of two significant drawbacks which have long made it appear desirable to provide improvements although the art has not until now evidenced such improvement.

One of these disadvantages is the fact that because of the arrangement of the plucking roller the operator of the vehicle is forced to advance the vehicle with great precision and with little lateral spacing along the respective row of plants; even small deviations in lateral direction would result in high losses of produce harvested, in that such produce would no longer be engaged and harvested by the plucking roller. Another disadvantage of equal seriousness is the fact that these known harvesting machines permit the harvesting of produce only from one row of plants at a time, evidently an undesirably time-consuming process where large-scale production is necessary. An attempt has been made to overcome this second difficulty by mounting several plucking rollers which are spaced from one another and so arranged that each of them acts upon a different row of plants as the vehicle advances. It was found, however, that there is not only a natural limit to the number of plucking rollers which can be so provided on a single harvesting machine, with a self-evident increase in the complexity and expense of the machine, but also that the first-mentioned disadvantage is necessarily made even more pronounced with a thus-modified harvesting machine.

Thus, the art until the present time did not provide for a harvesting machine of the type under discussion which successfully overcame the difficulties of those machines heretofore in use.

SUMMARY OF THE INVENTION

It is, accordingly, an object of the present invention to overcome these disadvantages.

More particularly it is an object of the present invention to provide an improved harvesting machine of the type under discussion which is not possessed of these disadvantages.

Still more specifically it is an object of the invention to provide such a harvesting machine which is capable of simultaneously harvesting produce from several rows of plants, irrespective of the number of rows and the elongation of the rows.

In pursuance of the above objects, and others which will become apparent hereafter, one feature of the invention resides in a harvesting machine for harvesting produce from plants growing in elongated rows, which harvesting machine briefly stated comprises a vehicle capable of advancing longitudinally of the respective rows, stripping or plucking means on the vehicle extending transversely to the elongation of the rows and operative for plucking produce off the plants, receiving means behind the plucking means with reference to the direction of advancement and adapted for receiving produce plucked off the plants, and plant engaging means for engaging and drawing into the operative range of the plucking means the successive plants of the rows.

It is the essence of the invention, therefore, that the longitudinal axis of the plucking roller which constitutes a part of the plucking means, extend at least substantially horizontally as well as transversely to the elongation of the rows, and that the engaging means be in form of a device which is arranged ahead of the plucking means and is inclined upwardly and forwardly in the direction of advancement of the vehicle at a predetermined angle so selected that as the plants are engaged by the engaging means, they will be drawn towards the plucking means with their tips or upper ends being brought into contact with the plucking means first before the remainder of the plant comes in such contact.

It was found quite surprisingly that with this arrangement it is possible to provide the desired advantages while avoiding the aforementioned undesired disadvantages, and that with this arrangement the harvesting can be carried out with the plucking roller extending transversely to the elongation of the rows without tearing the plants out of the ground. Heretofore it was thought that with such an orientation of the plucking roller with reference to the row of plants being harvested, the plants would be serially torn out of the ground by engagement with the plucking roller and would therefore be destroyed. The experience with the apparatus according to the present invention shows that this is not the case with the present construction.

According to a currently preferred embodiment of the invention the plant engaging means will be provided in form of a device having a moving instrumentality which moves in direction oppositely the direction of rotation of the plucking roller and which is provided with engaging portions which engage the plants.

The novel features which are considered as characteristic for the invention are set forth in particular in the appended claims. The invention itself, however, both as to its construction and its method of operation, together with additional objects and advantages thereof, will be best understood from the following description of specific embodiments when read on connection with the accompanying drawing.

DESCRIPTION OF THE PREFERRED EMBODIMENTS

Figure 1:
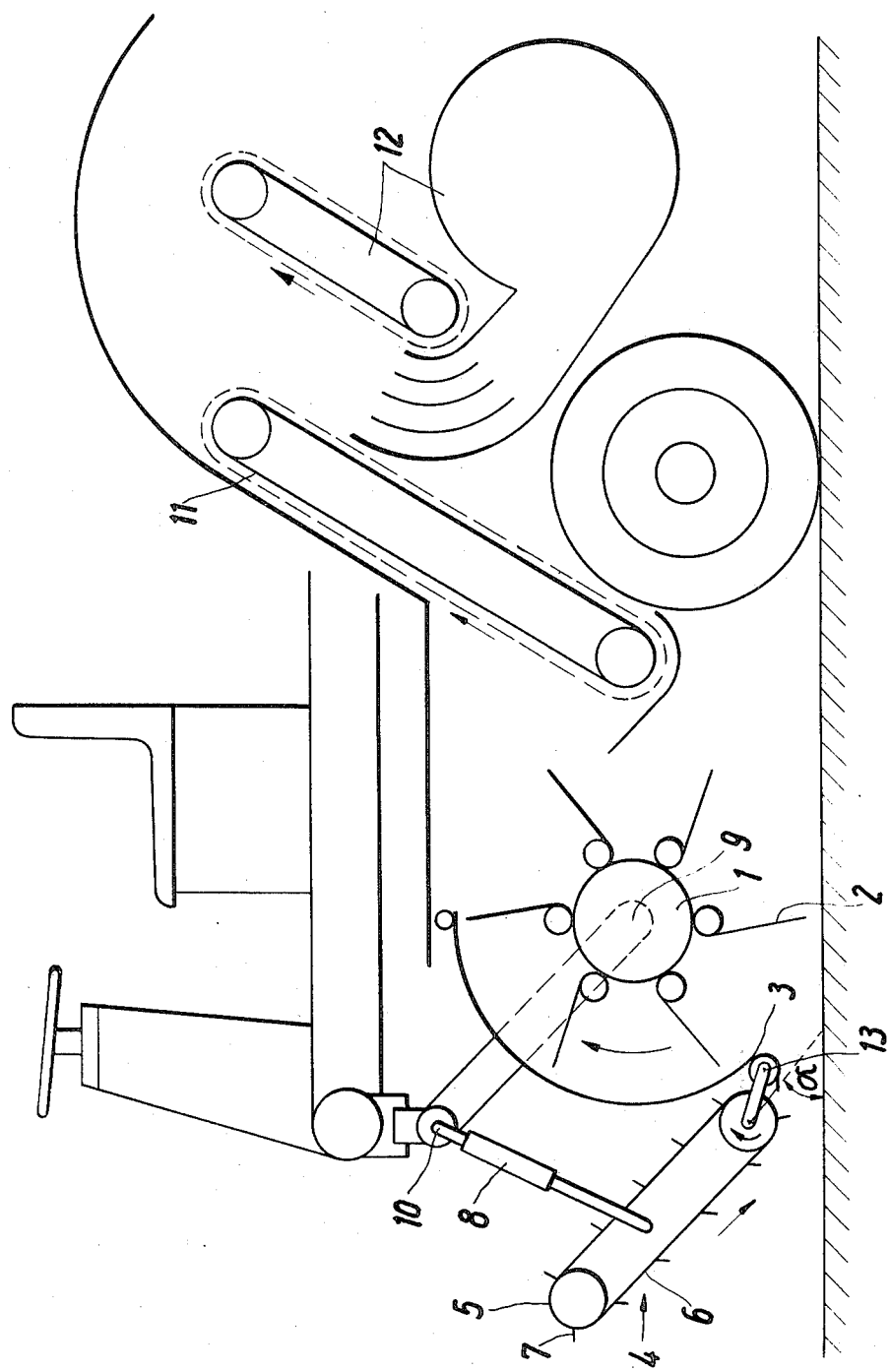
FIG. 1 is a diagrammatic side-elevational view of a harvesting machine embodying the present invention.
Figure 2:
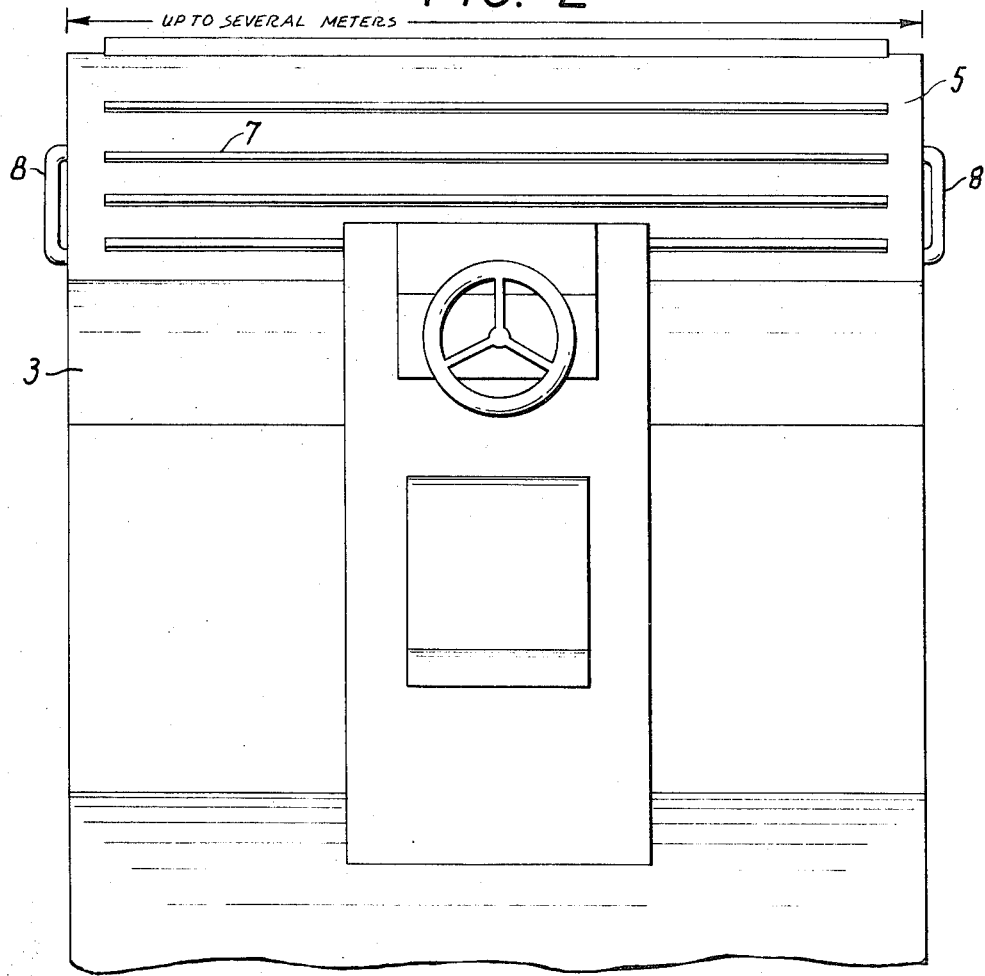
FIG. 2 is a top-plan view of FIG. 1.

As shown in FIGS. 1 and 2, the harvesting machine according to the present invention is in form of a vehicle which advantageously will be self-propelled. Details of the vehicle and whatever propulsion arrangement is provided for it are not illustrated because they may be entirely conventional and are not a part of the present invention. Merely for the sake of orientation a stirring wheel and a seat for the vehicle operator have been diagrammatically shown in the drawing.

With respect to FIGS. 1 and 2 it is pointed out that the harvesting machine would in normal operation advance in the direction towards the left-hand side of the drawing, following the elongation of the rows of plants which are to be harvested. Reference numeral 1 in the drawing identifies an elongated stripping or plucking roller which rotates about its longitudinal axis, the latter extending in at least substantial parallelism with the ground, that is extending at least substantially horizontal. Furthermore, the axis of rotation of the plucking roller 1 is so oriented with reference to the vehicle that as the vehicle advances along a row of plants to be harvested, the axis and therefore the plucking roller 1 extend transversely to the elongation of the row rather than in parallelism with the elongation. The plucking roller 1 is provided with plucking fingers 2 whose construction is known in the art, and which strip the produce off the plants when the latter become engaged. The fingers 2 cooperate with a sheet-metal trough, baffle or the like identified with reference numeral 3 and surrounding a portion of the periphery of the plucking roller 1 with spacing from the outer edges of the plucking fingers 2, over a portion of arc as illustrated. Produce, such as beans or the like, which is stripped off the plants by the plucking fingers 2 becomes deposited on the receiving means in form of a conveyor 11 which is located behind the plucking means as seen with respect to the direction of advancement of the vehicle. The conveyor 11, whose construction again is entirely conventional, then conveys the produce to a cleaning device 12, where adhering contaminants such as dirt are removed from the produce to the extent feasible in the field. Again, the construction and operation of the cleaning device 12 forms no part of the present invention and are therefore not described in detail, any desired cleaning device conventionally found in such harvesting machines being suitable.

It is emphasized that the machine according to the present invention makes it possible for the first time to harvest the produce from the plants of several parallel rows simultaneously and with a single plucking roller, it being evident of course that the plucking roller will extend from one side of the machine to the other, that is substantially over the entire width of the machine.

According to the present invention it is not sufficient for the plucking roller to be oriented in the manner just described, as compared with the orientation of plucking rollers in conventional harvesting machines of the type under discussion. Instead, it is necessary that there be further provided plant engaging means which acquires and supplies the plants to the plucking roller for stripping-off of the produce. The plant engaging means in the illustrated embodiment is in the form of a device 4 extending transversely to the elongation of the bush rows over the entire width of the machine and being upwardly inclined in forward direction at an acquisition or drawing-in angle $\alpha$, as illustrated in FIG. 1. This angle $\alpha$ is variable depending on the prevailing ground and plant conditions. In the exemplary illustrated embodiment of FIGS. 1 and 2 the plant engaging device comprises a belt 6 which is guided over reversing rollers 5 and is provided on its outer side with a plurality of engaging elements 7 which may be in the form of bars or the like. Advantageously the direction of advancement of the belt 6, and accordingly that of the elements 7, will be counter to the direction of rotation of the plucking roller 1, as identified by the arrows which are respectively associated with the device 4 and with the plucking roller 1.

As the vehicle advances, the device 4 engages the successive plants in the various rows and draws them into operative range of the plucking roller in such a manner that the plucking roller will first contact the tips or upper ends of the respective plants and then successively contact the remainder of the plant whereupon it will contact the tip or upper end of the next-following plant of the respective row and move along over this plant down towards the lower end thereof, with this being repeated with each and every one of the plants.

The device 4 and the member 3 are pivotably connected with one another for pivotal movement about the axis 13. A hydraulic cylinder 8 of any suitable construction is provided for varying the drawing-in angle $\alpha$ by displacing the device 4 about the axis 13, that is by tilting the leading or forward end of the device 4 further upward or further downward from what has been illustrated in FIG. 1. This accommodates the device to the requirements prevailing in a given situation. A further turning axis 10 extends in parallelism with the axis of rotation 9 of the plucking roller 1, and permits the plucking roller 1 to be tilted upwardly away from the ground if necessary, in order to increase the spacing between the outer tips of the plucking fingers 2 and the ground where this may be required.

It is pointed out, however, that the adjustability features afforded by the provision of the axes 10 and 13 need not be provided and that the apparatus will be operational within the scope of the present invention if they are absent. Still, by providing these axes and therefore the adjustment afforded thereby, it is possible not only to accommodate the device 4 to different circumstances, but also to accommodate the plucking roller 1 to different circumstances, for instance to raise it if the vehicle travels on a street, perhaps to and from the field where the harvest is to be carried out.

Figure 3:
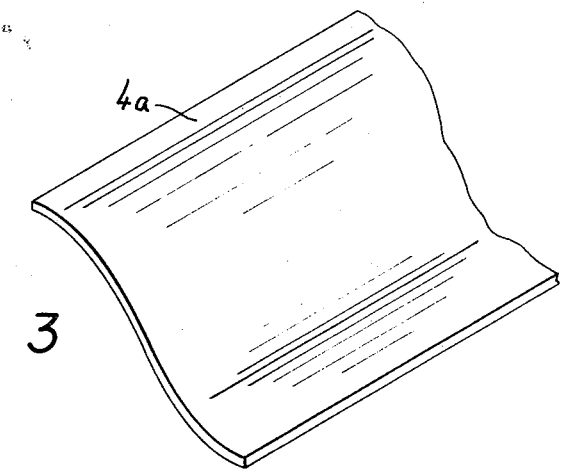
FIG. 3 is a perspective detail view illustrating a further embodiment.

With the device 4 configurated as illustrated in FIGS. 1 and 2 as above provided with the elements 7, the lower or downwardly directed run of the belt travels in the direction towards the plucking roller 1 and the elements 7 engage and move the tips of the plants towards the plucking roller 1, as previously identified. Naturally it is possible to provide a different construction for the device 4 than what has been illustrated in FIGS. 1 and 2. Thus it will be possible to utilize an appropriately dimensioned roller somewhat analogous to the plucking roller 1 but serving exclusively for supplying the tips of the plants to the plucking roller 1 in the same manner as the device 4 does. Conversely, the belt could be replaced for instance by a chain or several chains and under certain circumstances, namely if the soil over which the vehicle travels has certain characteristics and if the plants whose produce is to be harvested have certain characteristics, it is also possible to construct the device 4 in form of a sheet material—usually sheet metal— arrangement along which the plants glide towards the plucking roller 1. Such an arrangement can again be mounted either rigidly or displaceably in the manner discussed before with respect to FIGS. 1 and 2 and the axes 10 and 13. By way of example FIG. 3 illustrates such an arrangement whose purpose and configuration will be evident from the drawing without requiring more detailed explanation. The guide arrangement of FIG. 3 would replace the device 4 of FIG. 1 and is identified with reference numeral 4a.

It will be understood that each of the elements described above, or two or more together, may also find a useful application in other types of constructions differing from the types described above.

While the invention has been illustrated and described as embodied in a harvesting machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a harvesting machine for harvesting produce from plants growing in transversely spaced elongated rows, in combination, a vehicle having a front end, a rear end, and being adapted for movement longitudinally of the respective rows; stripping means including an elongated roller provided on said vehicle in the region of said front end and having an at least substantially longitudinal axis extending transversely of the elongation of said vehicle, a plurality of stripping fingers projecting from the circumference of said roller and being distributed both axially and circumferentially thereof, and wall means carried by said vehicle extending along said roller and surrounding the same over a portion of its periphery with slight spacing from said stripping fingers, said stripping means having a width greater than the width normally anticipated between two adjacent ones of said rows and being operative for stripping produce off said plants, and said roller being mounted for rotation in clockwise direction; receiving means on said vehicle behind said stripping means and adapted for receiving produce stripped off said plants; and plant-engaging means on said vehicle forwardly of said stripping means for engaging the successive plants of said rows and for drawing them rearwardly toward and into the operative range of said stripping means.

2. In a machine as defined in claim 1, said plant-engaging means comprising an engaging device upwardly inclined at a predetermined angle in direction forwardly of said front end of said vehicle and extending substantially over the entire width of the machine.

3. In a machine as defined in claim 1, wherein said receiving means is a conveyor.

4. In a machine as defined in claim 2, wherein said engaging device comprises plant-engaging elements mounted for displacement in an endless path and in a direction counter to said clockwise direction.

5. In a machine as defined in claim 2; further comprising first pivot means connecting said engaging device with said stripping means for relative pivotal displacement, and second pivot means mounting said stripping means for pivotal movement about a pivot axis paralleling said axis of said roller.

6. In a machine as defined in claim 2, said engaging device comprising an endless belt, reversing rollers for said belt spaced from one another in direction of said upwardly inclined device and plant-engaging elements on said belt at the outer side thereof.

7. In a machine as defined in claim 6, wherein said elements are bar elements extending parallel to the axis of said roller.

* * * * *